United States Patent [19]
Koma

[11] Patent Number: 5,608,556
[45] Date of Patent: Mar. 4, 1997

[54] LIQUID CRYSTAL DISPLAY HAVING ORIENTATION CONTROL ELECTRODES FOR CONTROLLING LIQUID CRYSTAL ORIENTATION

[75] Inventor: Norio Koma, Motosu-gun, Japan

[73] Assignee: Sanyo Electric Co., Ltd., Osaka, Japan

[21] Appl. No.: 263,871

[22] Filed: Jun. 21, 1994

[30] Foreign Application Priority Data

| | | | |
|---|---|---|---|
| Jun. 24, 1993 | [JP] | Japan | 5-153671 |
| Jul. 8, 1993 | [JP] | Japan | 5-169087 |
| Nov. 25, 1993 | [JP] | Japan | 5-295731 |
| Apr. 28, 1994 | [JP] | Japan | 6-092283 |

[51] Int. Cl.$^6$ .......................... G02F 1/1343; G02F 1/135; G02F 1/1337
[52] U.S. Cl. .................. 349/143; 349/42; 349/116; 349/123
[58] Field of Search ................... 359/54, 59, 75, 359/87, 72

[56] References Cited

U.S. PATENT DOCUMENTS

| | | | |
|---|---|---|---|
| 4,759,610 | 7/1988 | Yanagisawa | 359/87 |
| 5,042,918 | 8/1991 | Suzuki | 359/87 |
| 5,321,535 | 6/1994 | Ukai et al. | 359/59 |
| 5,339,181 | 8/1994 | Kim et al. | 359/59 |
| 5,345,324 | 9/1994 | Koseki et al. | 359/57 |
| 5,475,517 | 12/1995 | Konuma et al. | 359/75 |

FOREIGN PATENT DOCUMENTS

| | | | |
|---|---|---|---|
| 0058029 | 2/1990 | Japan | 359/72 |

OTHER PUBLICATIONS

Lien, A., et al., "Multi-domain homeotropic liquid crystal display for active matrix application", IBM Researh Division, Yorktown Heights, N.Y., pp. 21–24.

*Primary Examiner*—Sara W. Crane
*Assistant Examiner*—Fetsum Abraham
*Attorney, Agent, or Firm*—Loeb & Loeb LLP

[57] ABSTRACT

In a liquid crystal display of TFT active matrix type, the direction of orientation vectors of liquid crystal molecules are controlled for providing a wide viewing angle and preventing occurrence of disclination from making a rough display screen. With an orientation control electrode disposed on the periphery of a display electrode, an orientation control window, an electrode nonexistent portion, is formed in a common electrode and the potential difference between the orientation control electrode and the common electrode is set smaller than that between the display electrode and the common electrode. Alternatively, an orientation control window is likewise formed in the display electrode and the potential difference between the orientation control electrode, and the common electrode is set larger than that between the display electrode and the common electrode.

22 Claims, 14 Drawing Sheets

LIQUID CRYSTAL DISPLAY HAVING ORIENTATION CONTROL ELECTRODES FOR CONTROLLING LIQUID CRYSTAL ORIENTATION

BACKGROUND OF THE INVENTION

1. Field of the Invention

This invention relates to a liquid crystal display and more particularly to a liquid crystal display which provides a wide viewing angle and high display quality by controlling the orientation of liquid crystal directors.

2. Description of the Related Art

Liquid crystal displays have the advantages of their small size, slim form, and low power consumption. Therefore, they are becoming increasingly commercially practical for use in office automation machines, audio and visual machines, and the like. Particularly, the liquid crystal displays of the active matrix type using thin-film transistors (TFTs) as switching elements, which can display high-definition dynamic images, are used for television displays, etc.

To form the liquid crystal display, as shown in FIG. 1, a TFT substrate 2 comprising TFTs, display electrodes, etc., disposed like a matrix on a transparent substrate such as glass, and an opposed substrate 4 having common electrodes are affixed with a several μm thick liquid crystal layer 3 between, and both the substrates affixed to each other are sandwiched between two polarization plates 1 and 5 perpendicular to each other in a polarization axis direction.

The TFT substrate 2 has a structure in which TFTs are formed around the intersections of gate lines (scanning lines) and drain lines (data lines) and display electrodes located like a matrix are connected to the TFTs. The gate lines are scanned and selected in order, thereby turning on all TFTs on the same scanning line. Data signals synchronized with the turning on of the TFTs are supplied to the display electrodes on the drain lines. The common electrodes are also set to a predetermined potential in synchronization with gate line scanning, thereby applying a predetermined potential difference to display picture element capacitors formed by the common electrodes and opposite display electrodes for driving the liquid crystal.

Particularly, in the liquid crystal display using the ECB (electrically controlled birefringence) system, voltage is applied to display electrodes and common electrodes for controlling the orientation state of liquid crystal directors and a birefringence change is made in white light incident from a light source to provide an optical switch function. For example, a nematic crystal liquid having negative anisotropy of dielectric constant is used as the liquid crystal layer 3 and the initial orientation of liquid crystal directors is set to the direction vertical to the substrate face; the liquid crystal display of this type is called VAN (vertically aligned nematic) type.

In FIG. 1, white light incident from the TFT substrate 2 is passed through the first polarization plate 1 and results in linear polarization only. When no voltage is applied, the incident linear polarization is not subjected to birefringence in the liquid crystal layer 3, and thus is shut off by the second polarization plate 5 and black is displayed (normally black mode). When a predetermined voltage is applied to the liquid crystal layer 3, the orientation of the liquid crystal directors changes to the direction in which the orientation vector of the liquid crystal molecules having negative dielectric constant anisotropy approach a right angle with the electric field direction. Since a liquid crystal has anisotropy in refractive index, the linear polarization incident on the liquid crystal layer is subjected to birefringence and becomes elliptic polarization and light is transmitted through the second polarization plate 5. The transmitted light strength in the liquid crystal display depends on the voltage applied to the liquid crystal layer. Therefore, gradation display is enabled by adjusting the applied voltage for each picture element; light and dark (monochrome) display at the picture elements is visible as a predetermined display image on the entire display.

In the VAN type, macromolecular films of polyimide (S1Nx) are formed on the surfaces of both substrates 2 and 4 and rubbing treatment is applied to the films, thereby giving a predetermined pretilt angle to the initial vertical orientation of the liquid crystal directors for controlling the orientation of the liquid crystal directors. Further, for example, the opposed substrate 4 is formed with a color filter installed on an optical path and the color capability is combined with the optical shutter effect of ECB to provide color display.

FIG. 2 is a plan view showing a light transmission state when the conventional liquid crystal display using the ECB system shown in FIG. 1 is driven. Although not discussed in the description given so far, a shielding film made of metal, etc., is normally formed on the opposed substrate for shutting off transmission of light except for openings 201 corresponding to the picture elements arranged like a matrix. In the shield area 200, light leakage between the picture elements is prevented and the shield area 200 is displayed in black, thereby improving display contrast. In each opening 201, the transmission rate of light is controlled to provide the desired display; a black area called disclination 202 also occurs in the opening 201. When a plurality of areas differ in orientation vector of liquid crystal, the orientation of liquid crystal directors is disarranged on boundaries between the areas, and the area indicating a transmission rate different from that in other areas is the disclination.

For liquid crystal directors in nematic phase, the orientation vector, when voltage is applied, is restricted only at an angle with the electric field direction and the azimuth with the electric field direction as an axis is released. That is, with the electric field effect only, an orientation vector oriented to a plurality of directions obtained by rotating with the electric field direction as the axis of symmetry is possible. On the other hand, the TFT substrate has electrode irregularities on the surface and surface orientation treatment is uneven. An electric field in a lateral direction exists due to the potential difference between the electrodes in a liquid crystal cell. Therefore, areas different in orientation vector of liquid crystal molecules occur in the cell. If an orientation vector error exists even partially, since liquid crystal has a continuum property, orientation vectors having an azimuth following the liquid crystal having the erroneous orientation vectors extend over a certain area. If such a phenomenon occurs at more than one place in the cell, more than one area has orientation vectors which are the same in angle with the electric field direction, but differ in azimuth. On the boundaries between the areas, the light transmission rate differs from that in other areas, causing disclination to occur. If disclination of different form for each picture element occurs frequently, the display screen will have a rough surface and the expected color display will not be provided.

If orientation vectors of liquid crystal molecules in each area become irregular in the display area, there is a chance that viewing angle dependency will arise.

On the other hand, in the VAN type, etc., due to static electricity occurring during rubbing treatment, TFT threshold or mutual conductance shift results in electrostatic discharge damage, etc.

SUMMARY OF THE INVENTION

It is therefore an object of the invention to provide a solution to the above-mentioned problems.

To this end, according to the invention, there is provided a liquid crystal display comprising a first substrate and a second substrate. The first and second substrates are located facing each other with a liquid crystal layer therebetween. The display also includes a plurality of display electrodes located like a matrix and switching elements connected to the display electrodes. The display elements and the switching elements are formed on the liquid crystal layer side of the first substrate, and a common electrode is formed on the liquid crystal layer side of the second substrate, so that when a predetermined voltage is applied to the liquid crystal layer for display. The improvement is orientation control electrodes formed on the first substrate and which are electrically insulated from the display electrodes. Also, a potential different from that of the display electrode is applied to the orientation control electrode for controlling the orientation of the liquid crystal.

Thus, the orientation control electrodes to which a potential different from that of the display electrodes is applied are provided, so that the electric field in liquid crystal cells can be securely controlled according to the potential differences between the orientation control electrode and the common electrode and between the display electrode and the common electrode. It is also made possible to specify the azimuth of orientation vectors of liquid crystal molecules.

The electric field direction in the liquid crystal cell is inclined toward a predetermined direction from the normal direction of the substrate according to the effective potential difference between the display and orientation control electrodes. When a voltage is applied to the liquid crystal layer by both the electrodes, a predetermined angle occurs between the initial orientation direction of liquid crystal directors and the electric field direction. Thus, the liquid crystal directors incline in a direction to increase the angle of the electric field direction with the initial orientation direction in the shortest way. A determination is made to only one orientation vector of the liquid crystal molecules.

The orientation control electrodes may be formed in all areas except the formation area of the display electrodes or at least surrounding the periphery of the display electrodes.

If the orientation control electrode is located so as to surround the periphery of the display electrode, liquid crystal directors are subjected to equal orientation control on four sides of the display electrode. The orientation vectors of liquid crystal molecules incline at right angles to each side. Since the liquid crystal molecules have a continuum property, if the orientation state is controlled on each side of the display electrode, they are aligned to substantially equal orientation vectors to the center of the display electrode. Therefore, display quality can be improved.

If the orientation control electrodes are formed in all areas except the formation area of the display electrodes, light leakage in the non-display area can be prevented, eliminating the need for installing a shielding film on the opposed substrate side.

Further, if the orientation control electrodes are formed partially overlapping the display electrodes, light leakage in the non-display area can be securely prevented. Therefore, if a shielding film is formed on the opposed substrate side, an alignment margin can be set with the outer peripheral edge of the orientation control electrode as a reference, thereby reducing the margin to affix substrates for preventing the aperture ratio of the liquid crystal display from lowering.

An orientation control window containing no electrode may be formed in the picture element area of the common electrode or the display electrode. No electric field occurs in the window portion and liquid crystal directors are fixed to the initial orientation state. Therefore, the orientation control electrode and window enable the orientation vectors of the liquid crystal molecules to be fixed in one direction near the orientation control electrode and window. Because of the continuum property of liquid crystal, the orientation vectors of the liquid crystal molecules in the display electrode are aligned. Further, the orientation control window enables the boundaries between areas different in azimuth of orientation vectors in the display area to be fixed without variations from one picture element to another.

If the orientation control window is formed in the picture element area of the common electrode, the effective potential difference between the orientation control electrode and the common electrode is set smaller than that between the display electrode and the common electrode. On the other hand, if the orientation control window is formed in the picture element area of the display electrode, the effective potential difference between the orientation control electrode and the common electrode is set larger than that between the display electrode and the common electrode.

Near the edge of the orientation control window, an electric field occurs slantingly from the electrode existent area to the electrode nonexistent area in the liquid crystal layer. That is, the electric field occurring from the electrode opposed to the orientation control window avoids the orientation control window and moves to the electrode existent portion.

Therefore, the inclined direction of the electric field defined by the orientation control electrode and that defined by the orientation control window match in each zone of each picture element area, uniformly defining the orientation state of the liquid crystal molecules.

Particularly, if the orientation control window is formed like an X character, the orientation state of each picture element area is divided into four equal zones. Therefore, when an image is displayed, transmitted light in the four zones is composed, providing a liquid crystal display having low viewing angle dependency with four optimum viewing directions and a wide viewing angle.

DESCRIPTION OF THE PREFERRED EMBODIMENTS

Referring now to the accompanying drawings, there are shown preferred embodiments of the invention.

Figure 1:
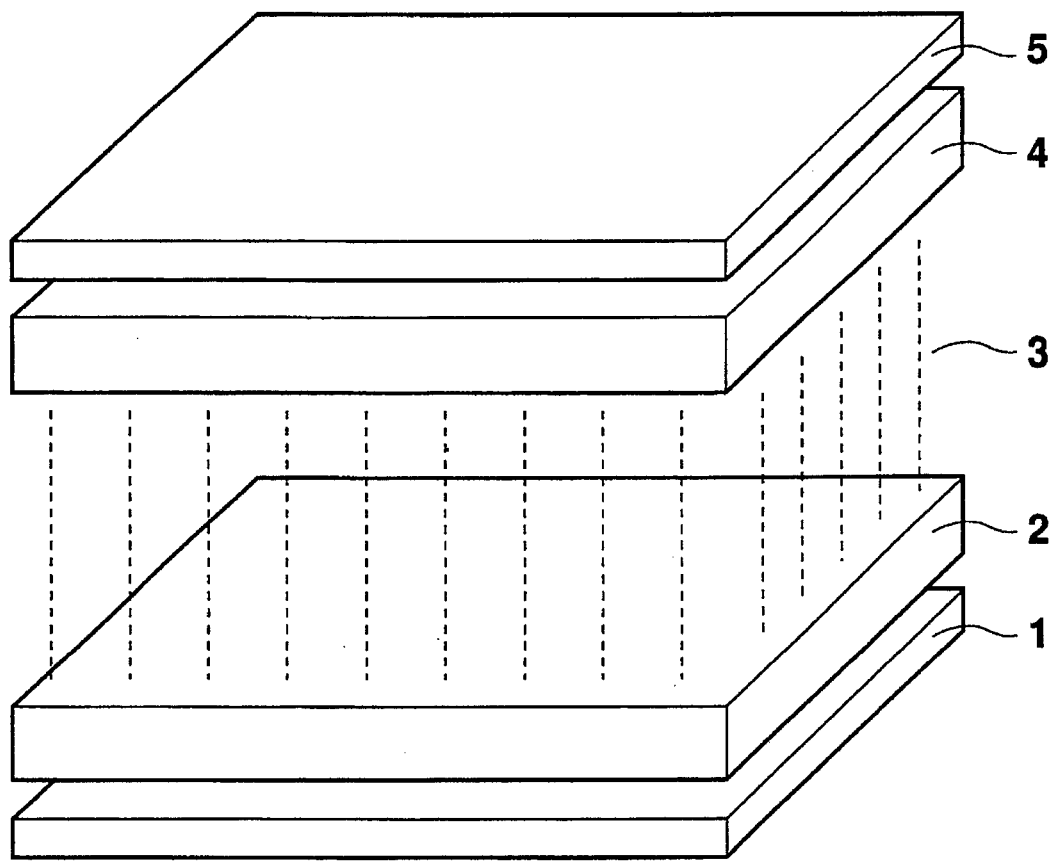
FIG. 1 is a structural drawing of a conventional liquid crystal display.
Figure 2:
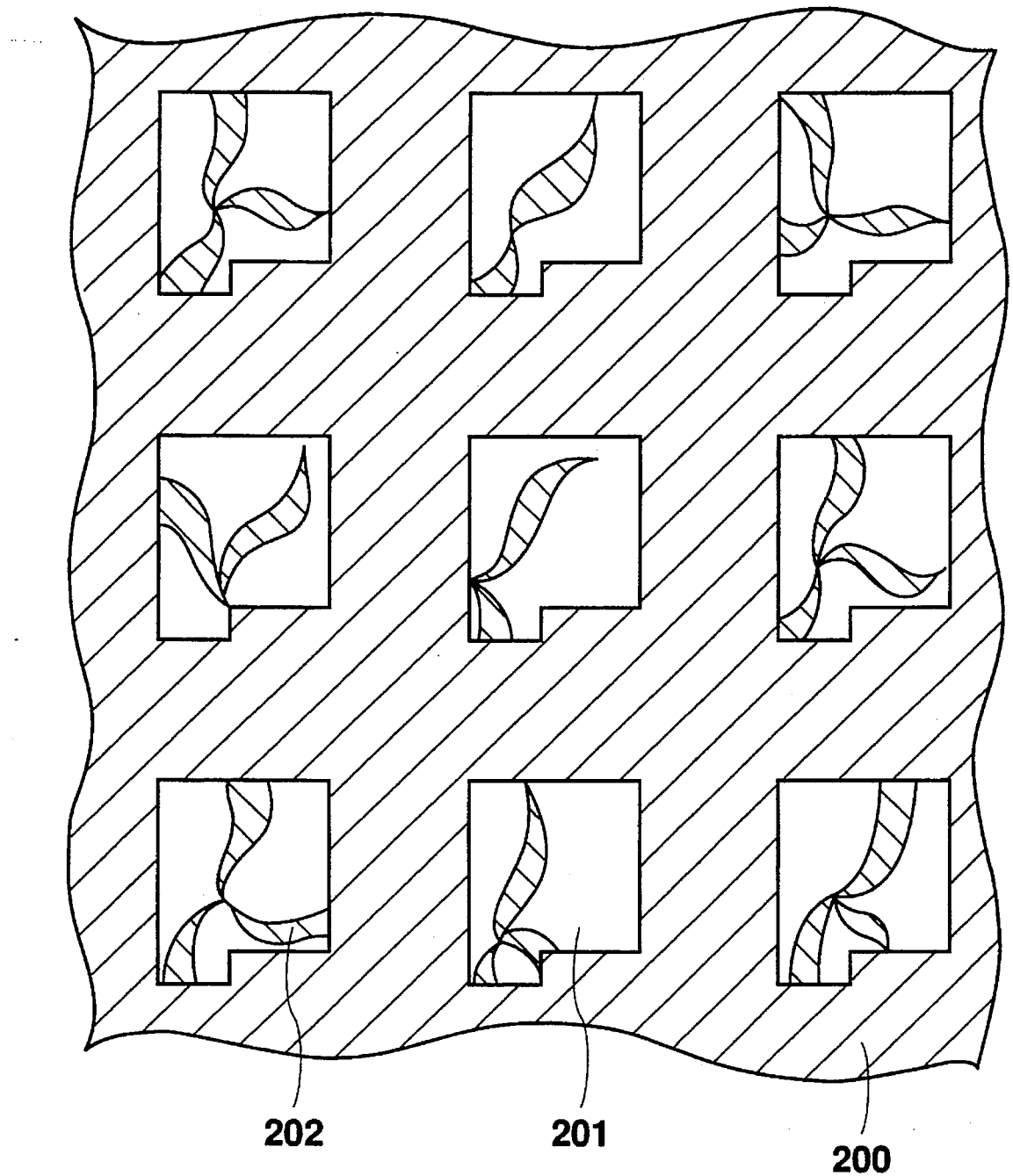
FIG. 2 is a plan view illustrating problems on the conventional liquid crystal display.
Figure 3:
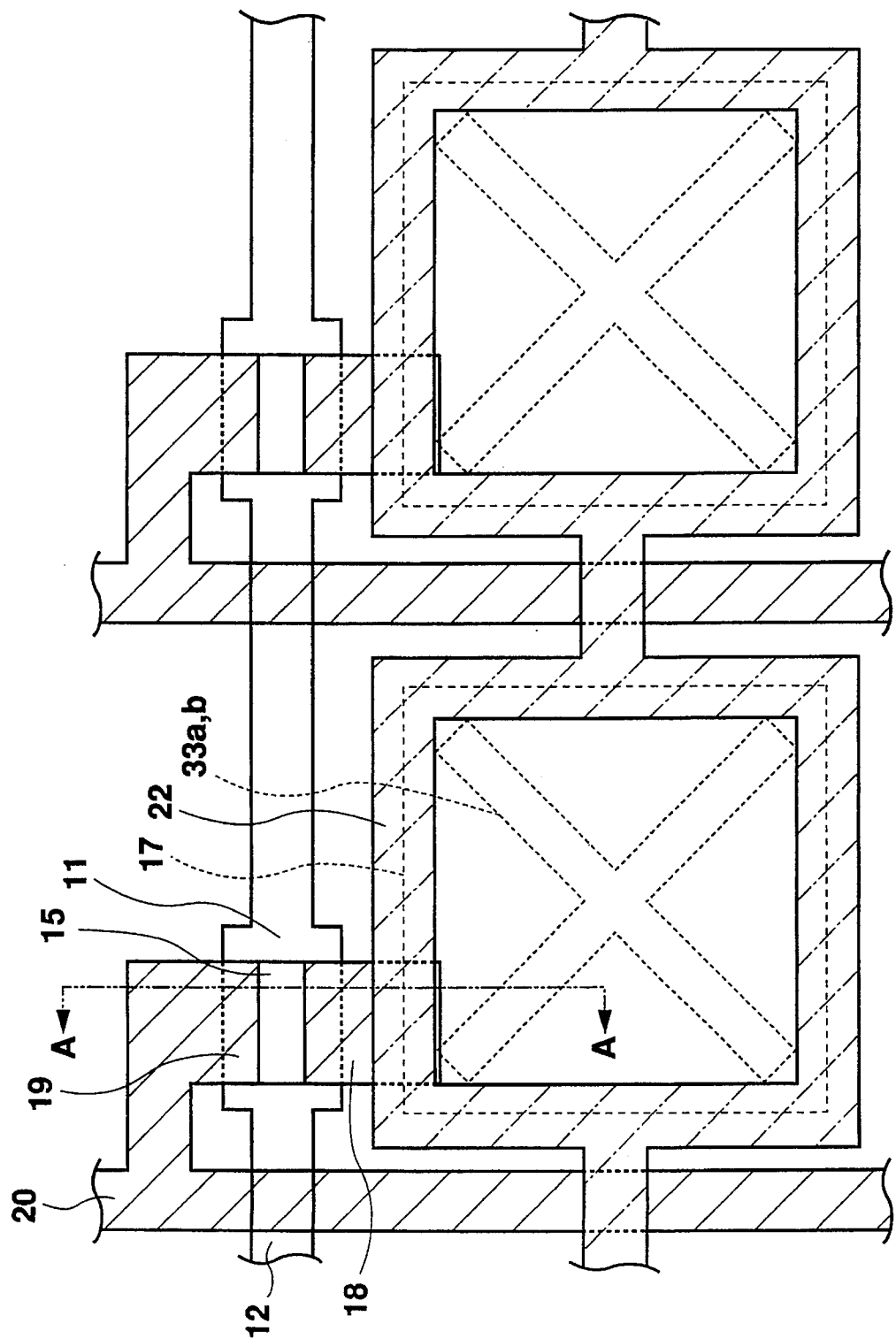
FIG. 3 is a plan view of a liquid crystal display according to a first or second embodiment of the invention.

A first embodiment of the invention will be discussed. FIG. 3 is a plan view of a TFT substrate showing an electrode pattern of two picture elements. Gate lines 12 and drain lines 20 are crossed on the substrate. A display electrode 17 is located in the area surrounded by the gate lines 12 and the drain lines 20. A TFT is formed at the intersection of both the lines 12 and 20 or around the intersection, and a source electrode of the TFT 18 is connected to the display electrode 17. An orientation control electrode 22 is located so as to surround the periphery of the display electrode 17 and they are connected to each other in the row direction (the direction substantially parallel to the gate line). The X letter area indicated by the dotted line in FIG. 3 denotes an orientation control window 33a formed as an electrode nonexistent portion at a common electrode formed on an opposed substrate (not shown). The orientation control window 33a corresponds to the display electrode on the TFT substrate as a plane.

A more detailed description will be given in conjunction with FIG. 4, which is a sectional view taken on line A—A in FIG. 3. An about 1500Å thick gate electrode 11 and gate line 12 formed by sputtering and photoetching Cr, for example, are located on a transparent substrate 10 such as glass. SiNx is laminated by CVD (chemical vapor deposition) on almost the full face of the substrate so as to cover the gate electrode 11 and gate line 12 to form a gate insulation film 13, which is about 2000Å–4000Å thick. Following the gate insulation film 13, a-S1 (amorphous silicon) 14, etching stopper 15, and N⁺a-S1 16 are laminated on the gate electrode 11 like an island by CVD film forming and photoetching, whereby channel and contact layers of the TFT are formed. On the other hand, in a different area on the gate insulation film 13 where the gate electrode 11 is not formed, an about 1000Å thick display electrode 17 is formed by sputtering and photoetching of ITO (indium tin oxide), transparent conductive material. The top layer is source drain wiring. A source electrode 18, drain electrode 19, and drain line 20 are formed by photoetching a pattern of Mo/Al laminated at a thickness of 1000Å/7000Å by sputtering, for example.

The following describe a general structure of the TFT substrate. In the present application, the full face is coated with an interlayer insulation film 21 such as SiNx, then an orientation control electrode 22 is disposed so as to surround the periphery of the display electrode 17. SiNx is laminated at a thickness of 0.5–1 μm by CVD, etc. The orientation control electrode 22 is formed on the interlayer insulation film 21 by laminating and patterning Al, Cr, Mo, etc., for example. As shown in FIG. 3, the orientation control electrode 22 is located so as to surround the periphery of the display electrode 17 and they are connected to each other with respect to the picture element on the same row (the same gate line).

Further, an orientation film 23 such as polyimide (S1Nx) is laminated on the full face for vertical orientation as a surface orientation treatment, whereby the initial orientation of liquid crystal directors 40 is defined in the normal direction of the substrate. Rubbing treatment of the orientation film 23 is not required.

In the invention, the TFT substrate is not limited to the structure mentioned here.

On the other hand, a shielding film 31 for opening each picture element portion and shutting off transmission of light through non-display portions is formed by Cr, etc., on a transparent substrate (opposed substrate) 30 facing the TFT substrate with a liquid crystal layer 41 therebetween. The full face of the shielding film 31 is coated with ITO for forming a common electrode 32. The display area of each picture element of the common electrode 32 is etched like an X letter as indicated by the dotted line in FIG. 3 for forming an orientation control window 33a, an electrode non-existent portion at the common electrode 32. Further, a vertical orientation film 34 as on the TFT substrate is formed on the full face of the substrate 30 on the common electrode 32 and the orientation control window 33a for completing the opposed substrate. The common electrode 32 is connected to the TFT substrate side by silver paste, etc., at four corners of the substrate and a signal is applied from an input terminal installed on the TFT substrate side. The orientation control electrode 22 connected for each row is also connected to the input terminal in common and the same signal as the common electrode is input.

Figure 5:
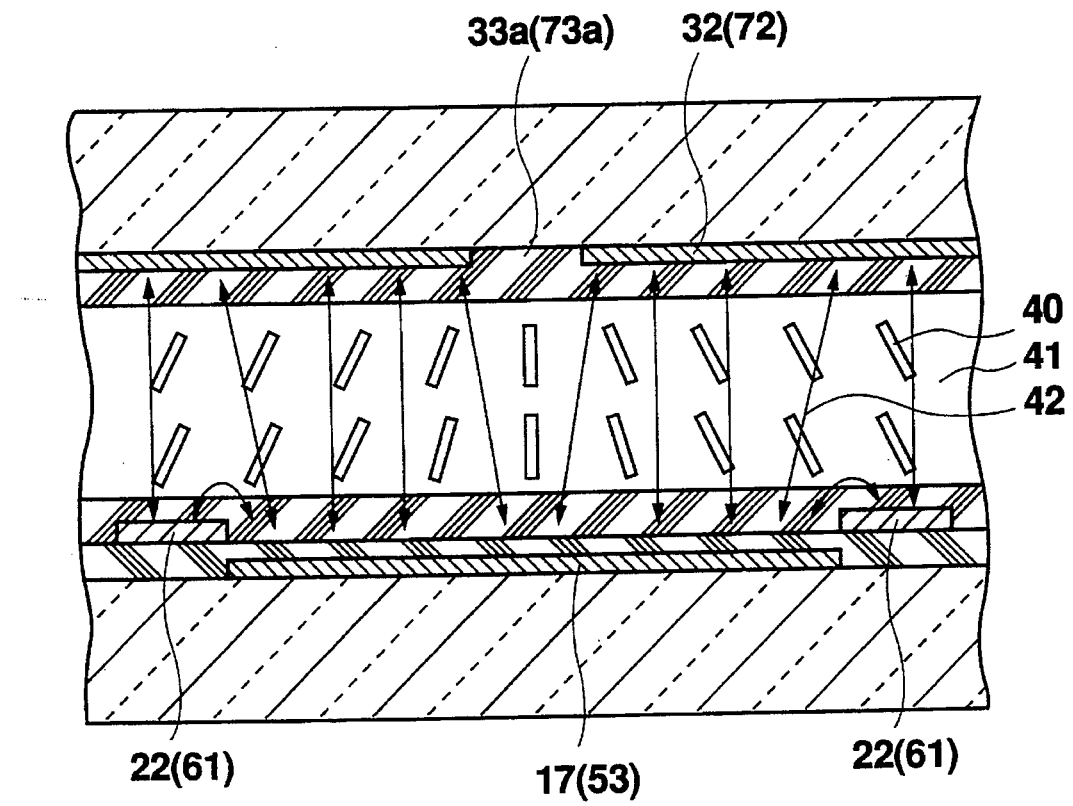
FIG. 5 is a sectional view illustrating the function and effect of the first embodiment.
Figure 6:
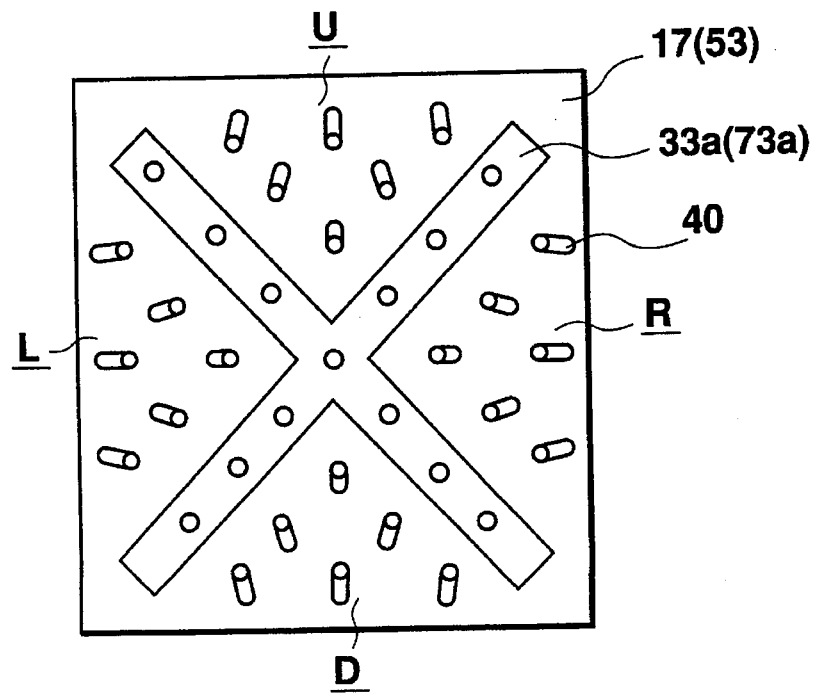
FIG. 6 is a plan view illustrating the function and effect of the first embodiment.

FIG. 5 is a sectional view showing the operation in the cell when the liquid crystal display in the embodiment is driven. The orientation control electrode 22 is located on both sides of the display electrode 17. They face the common electrode 32 with the liquid crystal layer 41 therebetween. In the embodiment, the effective potential difference between the orientation control electrode 22 and the common electrode 32 is set smaller than that between the display electrode 17 and the common electrode 32. Therefore, in the periphery of the display area, an electric field 42 occurs from the display electrode 17 to the common electrode 32 in a slant direction from within the display area to the outside of the display area, thereby specifying the angle of the orientation vector of liquid crystal directors 40 with the electric field 42 and the azimuth with the electric field direction as an axis. That is, if the initial orientation vector is at some angle with the electric field direction, elasticity based on a continuum property of the liquid crystal causes the orientation vector to change in a direction to increase the angle in the shortest way when an electric field is applied, so that stable energy is provided. This effect is point symmetry in relation to four sides of the display electrode 17, as shown in FIG. 6. Since the orientation control window 33a in the common electrode 32 contains no electrode, a weak or no electric field occurs around the orientation control window 33a and the liquid crystal directors 40 are fixed to the initial orientation state.

Thus, for the liquid crystal directors 40, the orientation vector direction is specified as point symmetry in relation to the four sides of the display area by the effect of the orientation control electrode 22 and the boundaries between areas different in orientation vector are fixed by the orientation control window 33a. Because of the continuum property of liquid crystals, orientation vectors can be restricted symmetrically at all picture elements and uniformly in their respective zones. The picture element display section is divided into four zones separated by the orientation control window 33a, U, D, L, and R. For example, in visual recognition from the upper direction of the screen, average transmitted light in zones U and D and composite light in zones L and R are recognized as transmitted light near the condition of visual recognition from the front. With respect to other directions, likewise, transmitted light equivalent to that on the front is recognized, reducing viewing angle dependency for providing a wide viewing angle.

Figure 7:
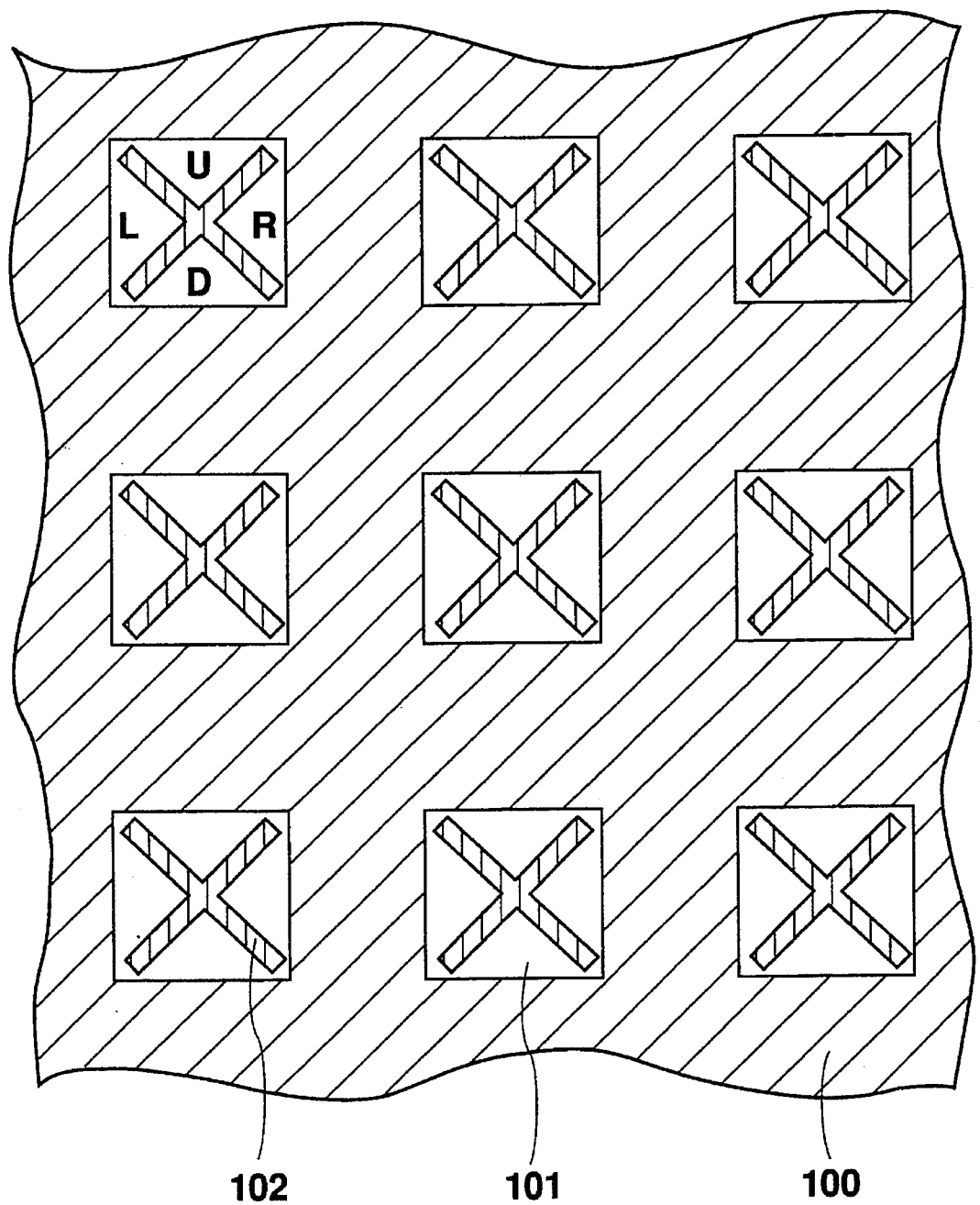
FIG. 7 is a plan view illustrating the function and effect of the invention.

FIG. 7 is a plan view showing a light transmission state when the liquid crystal display in the embodiment is driven. Openings 101 are arranged like a matrix in a black area 100 provided by the shielding film. Display is made as macroscopic composition of transmitted light corresponding to graduations controlled in the openings 101. Each opening 101 provides a picture element shown in FIG. 6 and the boundaries 102 defined by the orientation control windows which have the same form in all openings 101 are represented in black, but variations from one picture element to another do not exist, so that the display is not adversely affected.

Thus, according to the invention, the viewing angle characteristic in horizontal and vertical directions is improved for enabling display at wide viewing angles and disclination variations from one picture element to another are suppressed for improving display quality. The function and effect described above are the same if the polarity of the applied voltage is inverted.

To drive the liquid crystal display in the embodiment, the orientation control electrode 22 is electrically connected to the common electrodes 32, thereby eliminating the need for the driver circuit for the orientation control electrode 22. The orientation control electrode 22 is set to the same potential as the common electrode 32, thereby leveling the potential difference between both the electrodes 22 and 32. Therefore, the potential difference between both the electrodes 22 and 32 becomes smaller than that between the display electrode 17 and the common electrode 32, and electric field distribution in the cell becomes as shown in FIG. 5.

If the orientation control electrode 22 is located near the display electrode 17, the control function or effect of orientation vectors increases. Thus, the orientation control electrode 22 preferably abuts on the surround of the display electrode 17 as a plane or is partially superposed on the display electrode 17.

Particularly in the invention, as shown in FIG. 3, the orientation control electrode 22 is partially superimposed on the display electrode 17 for causing the superimposed portion to serve as substorage capacitance.

Since the structure shields transmitted light in the periphery of the display electrode 17, the affixing margin between the substrates can be made small and the opening percentage of the shielding film 32 on the opposed substrate side can be improved. The margin can be set based on the outer periphery of the orientation control electrode 22 rather than the periphery of the display electrode 17. Thus, the loss of the opening percentage caused by all margins can be reduced only to the alignment margin of the orientation control electrode 22 to the display electrode 17 on the TFT substrate side.

Figure 8:
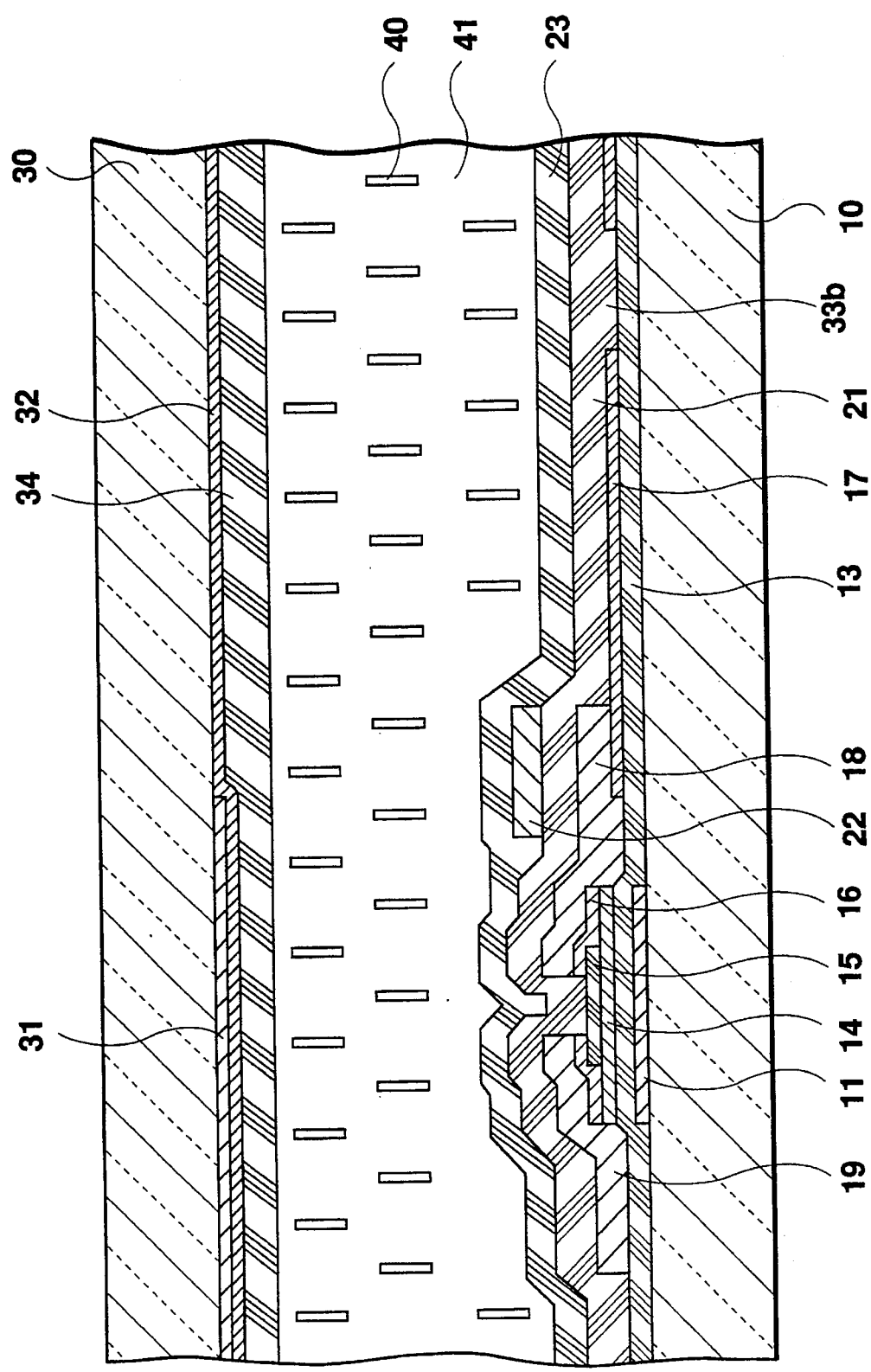
FIG. 8 is a sectional view taken on line A—A in FIG. 3.

Next, a second embodiment of the invention will be discussed. The plane structure is the same as that in the first embodiment shown in FIG. 3. The sectional structure taken on line A—A in FIG. 3 is shown in FIG. 8. The second embodiment is characterized by the fact that the orientation control window 33b located in the common electrode 32 in the first embodiment is located in a display electrode 17 as indicated by reference numeral 33b in FIG. 8 at the corresponding position on a TFT substrate 10. Further, the effective potential difference between an orientation control electrode 22 and a common electrode 32 is set larger than that between the display electrode 17 and the common electrode 32. The orientation control window 33b is opened at the same time as formation of the display electrode 17 when ITO is patterned.

Figure 9:
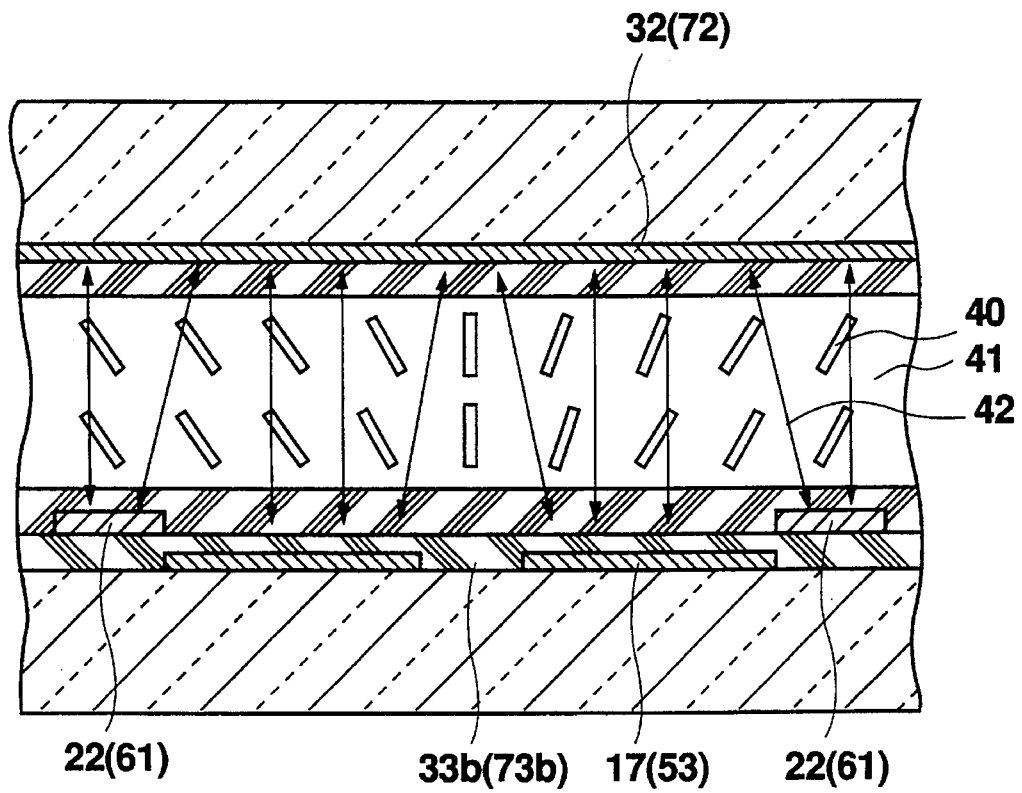
FIG. 9 is a sectional view illustrating the function and effect of the second embodiment.
Figure 10:
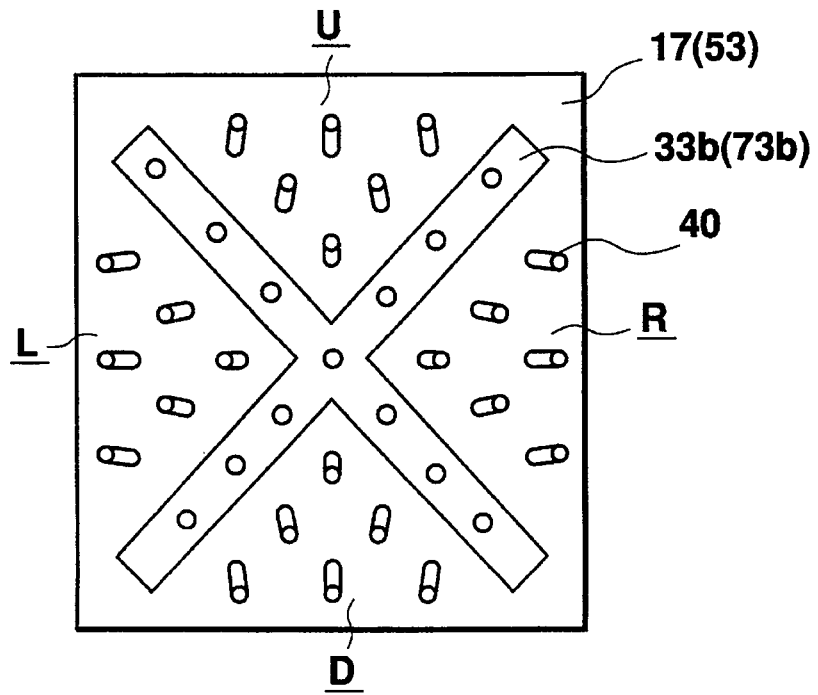
FIG. 10 is a plan view illustrating the function and effect of the second embodiment.

Thus, the potential difference between the orientation control electrode 22 and the common electrode 32 is larger than that between the display electrode 17 and the common electrode 32, as indicated by arrows in FIG. 9; so that in the periphery of the display area, an electric field 42 occurs from the common electrode 32 to the display electrode 17 in a slant direction from within the display area to the outside of the display area. On the other hand, no electric field exists around the orientation control window 33b. In this case, each liquid crystal director 40 has an orientation vector oriented in the direction opposite to that in FIG. 5 showing the first embodiment. Therefore, as shown in FIG. 10, because of the continuum property of liquid crystal, the directions of the orientation vectors can be restricted as point symmetry in the display area, reducing viewing angle dependency and suppressing disclination variations from one picture element to another, as in the first embodiment.

Particularly in embodiments of the invention, the direction of the electric field 42 becomes slanted at the edge of the orientation control window 33, as shown in FIGS. 5 and 9. To locate the orientation control window 33a on the opposed substrate side in order to align electric fields 42 in the slant direction by the orientation control electrode 22, the potential difference between the orientation control electrode 22 and the common electrode 32 is set smaller than that between the display electrode 17 and the common electrode 32. On the other hand, to locate the orientation control window 33b on the TFT substrate side, the potential difference between the orientation control electrode 22 and the common electrode 32 is set larger than that between the display electrode 17 and the common electrode 32.

The orientation control electrode 22 is placed above the layer forming the TFT in the first and second embodiments, but may be located on the same layer as the gate electrode 11 and the gate line 12. This means that the orientation control electrode 22 can also be formed below the display electrode 17 on the plane electrode layout shown in FIG. 3. In this case, when Cr is etched to form the gate electrode 11 and the gate line 12, the orientation control electrode 22 can be formed at the same time, so that the manufacturing process is shortened.

Figure 4:
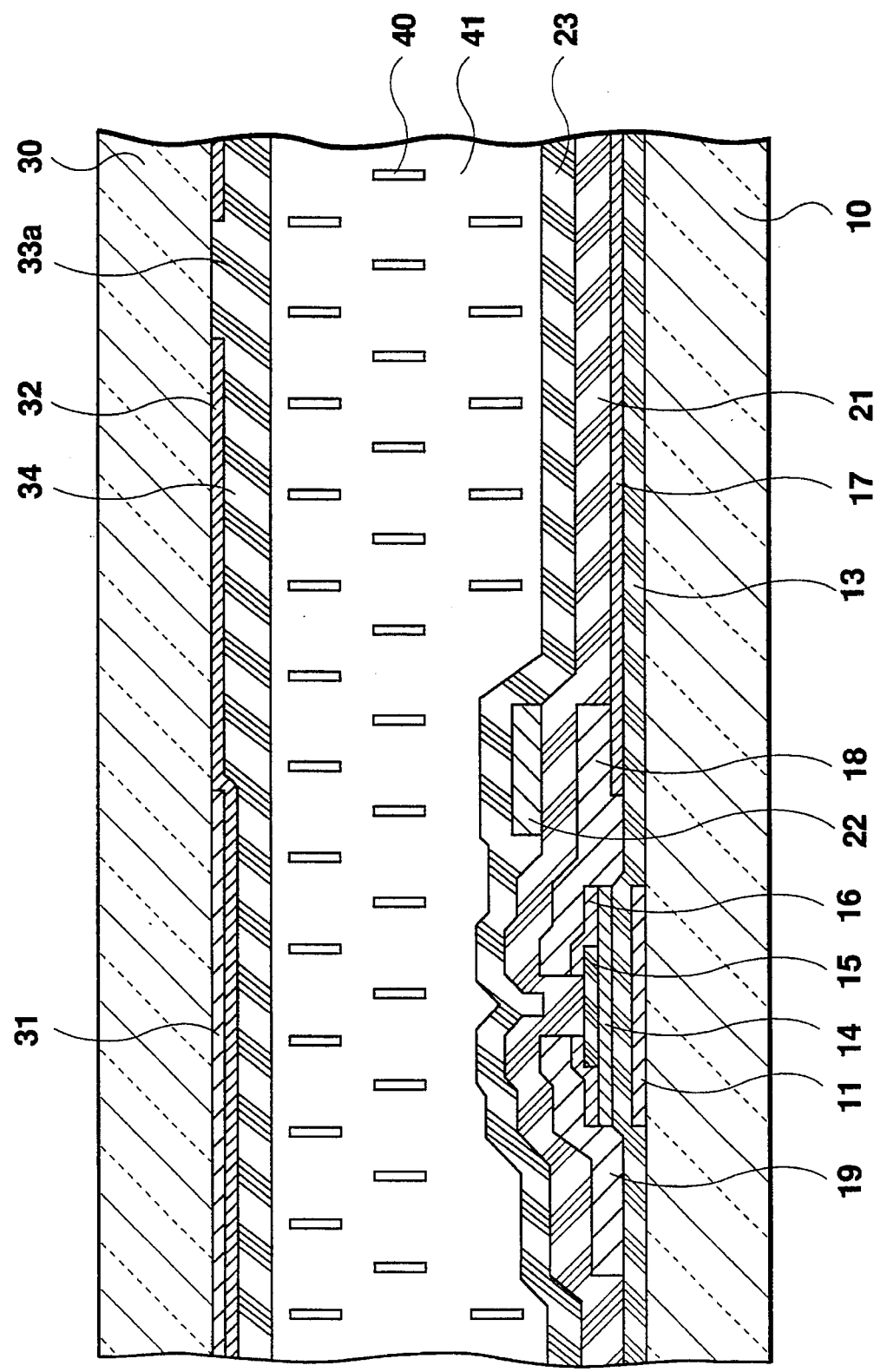
FIG. 4 is a sectional view taken on line A—A in FIG. 3.

The sectional structure of the TFT section is shown as in FIGS. 4 and 8 for the convenience of illustration; in fact, the liquid crystal layer 41 is 5–10 µm thick, while the TFT section film is 1–2 µm thick at most, and the picture element pitch is about 100–200 µm.

The main feature of embodiments of the invention lie in that the orientation control electrode 22 is disposed so as to surround the periphery of the display electrode 17. Thus, macroscopically, whether the orientation control electrode 22 is formed above or below the display electrode 17 does not introduce a serious problem. Either structure would produce the same effect as shown in FIGS. 5, 6, 9, and 10.

Figure 11:
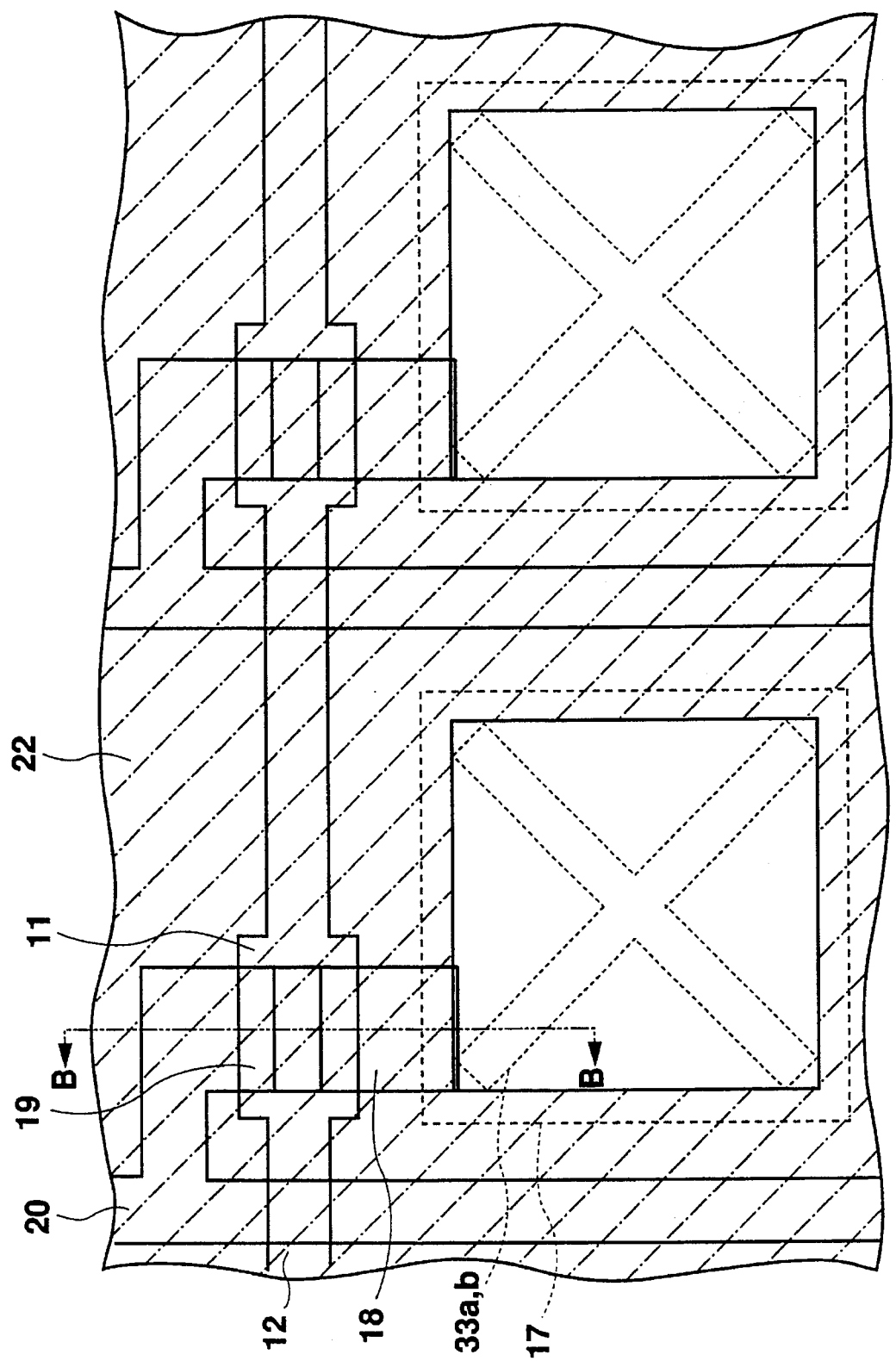
FIG. 11 is a plan view of a liquid crystal display according to third and fourth embodiments of the invention.

The basic function and effect of the third and fourth embodiments are the same as those of the first and second embodiments. FIG. 11 is a plan view common to the third and fourth embodiments. In the embodiments, an orientation control electrode 22' made of conductive material having a light non-transmission property such as Al, Cr, or Mo is located on a full face of a TFT substrate and the portion corresponding to a display area is opened by etching. That is, the orientation control electrode 22' is formed completely covering the top of the TFT, gate line 12, and drain line 20. Also, it is superposed partially on the periphery of a display electrode 17.

Figure 12:
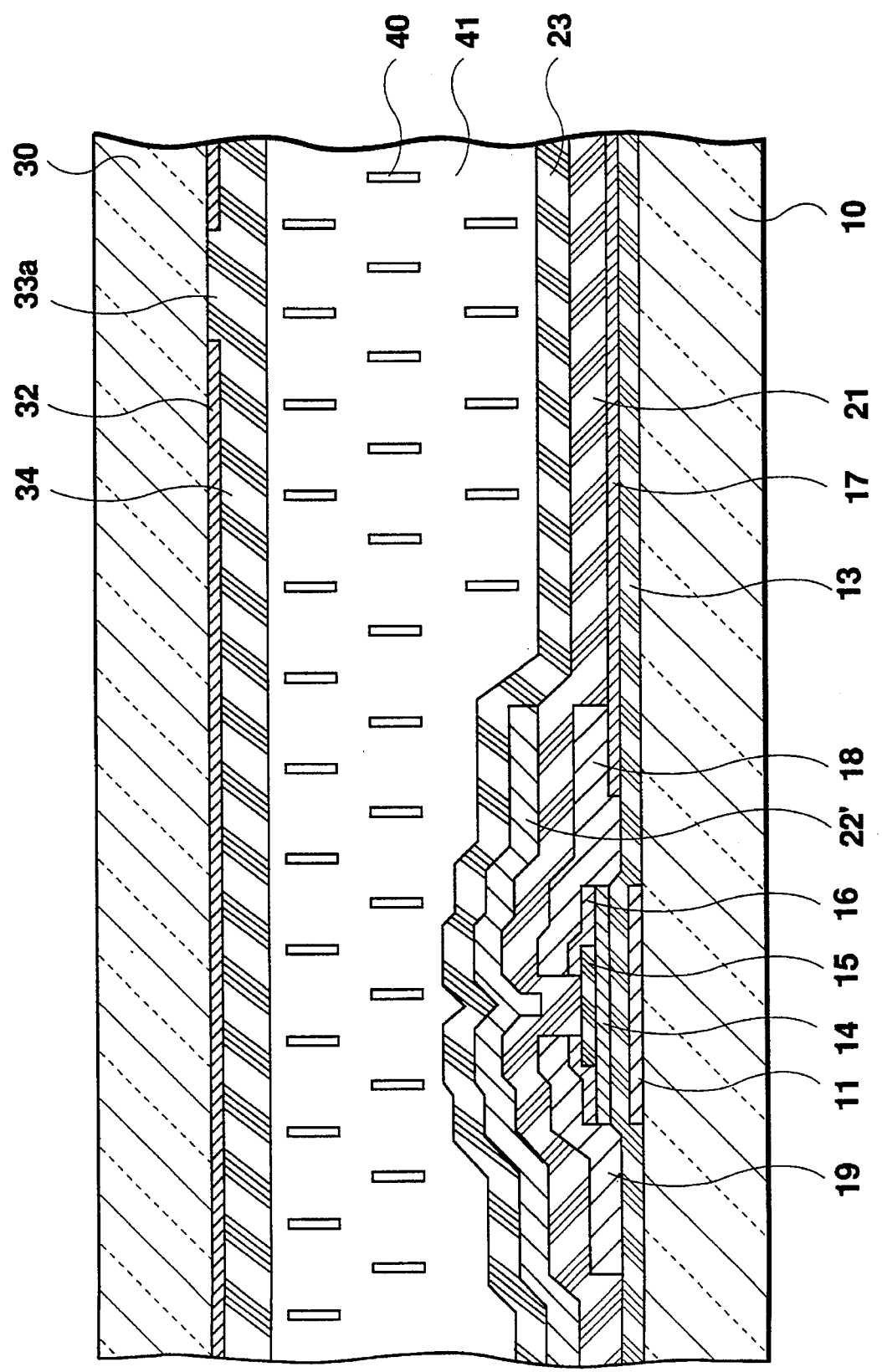
FIG. 12 is a sectional view taken on line B—B in FIG. 11.
Figure 13:
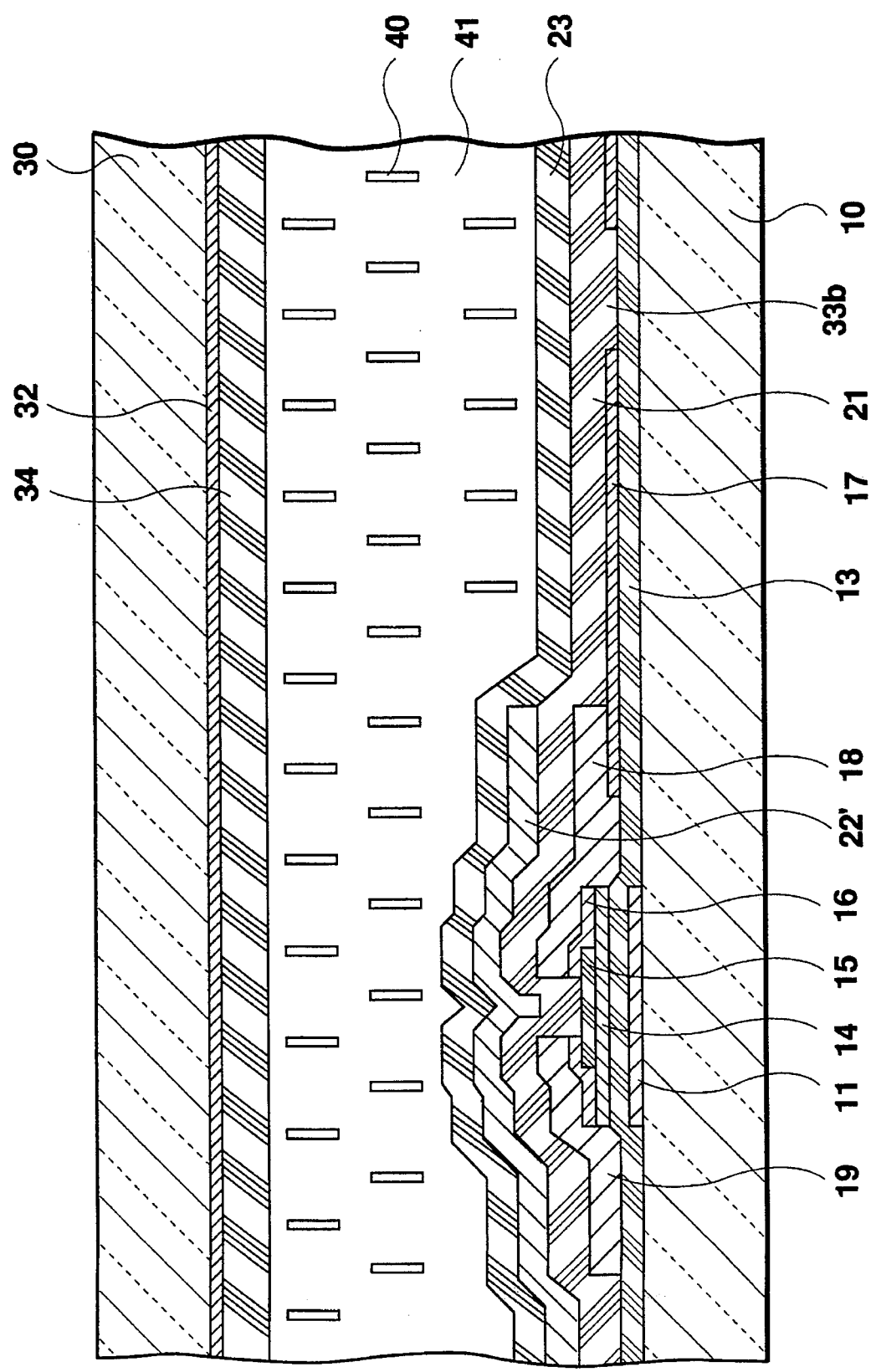
FIG. 13 is a sectional view of a structure different from FIG. 12, taken on line B—B in FIG. 11.

Sectional views taken on line B—B in FIG. 11 are shown in FIGS. 12 and 13. FIG. 12 shows the structure of the third embodiment, wherein an orientation control window 33a is located on the side of a common electrode 32 on an opposed substrate 30. FIG. 13 shows the structure of the fourth embodiment, wherein an orientation control window 33b is located on the side of a display electrode 17 on a TFT substrate 10. In the structures in FIGS. 12 and 13, the orientation control electrode 22' serves as a shielding film. Therefore, as seen in the figures, no shielding film is provided on the opposed substrate side. The structure with the shielding film located on the TFT substrate side can prevent a substrate affixing margin from reducing the effective display area and improve the aperture ratio compared with the structure with the shielding film located on the opposed substrate side.

Since the orientation control window is located on the common electrode side in the cell in FIG. 12, it is required that the effective potential difference between the orientation control electrode 22' and the common electrode 32 should be smaller than that between the display electrode 17 and the common electrode 32 as shown in FIG. 5. To meet this requirement, the orientation control electrode 22' needs to be connected to the common electrode 32 for setting to the same potential. At this time, the orientation control electrode 22' can also be actively superimposed on the display electrode 17 so that the superimposed portion is made to function as substorage capacitance at each picture element.

Next, a fifth embodiment of the invention will be discussed. FIG. 15 is a plan view showing an electrode pattern. Gate lines 60 and drain lines 54 are crossed. A display electrode 53 is located in the area surrounded by the gate lines 60 and the drain lines 54. A normal stagger type TFT is formed at the intersection of both the lines 54 and 60 or around the intersection, and a part of the display electrode 53 serves as a source electrode 56. An orientation control electrode 61 is located so as to surround the periphery of the display electrode 53 and the orientation control electrodes 61 on the same row are connected to each other in the row direction. The X letter area indicated by the dotted line in FIG. 14 is an area corresponding to a plane of an orientation control window 73a formed as an electrode nonexistent portion at a common electrode on an opposed substrate (not shown).

Figure 14:
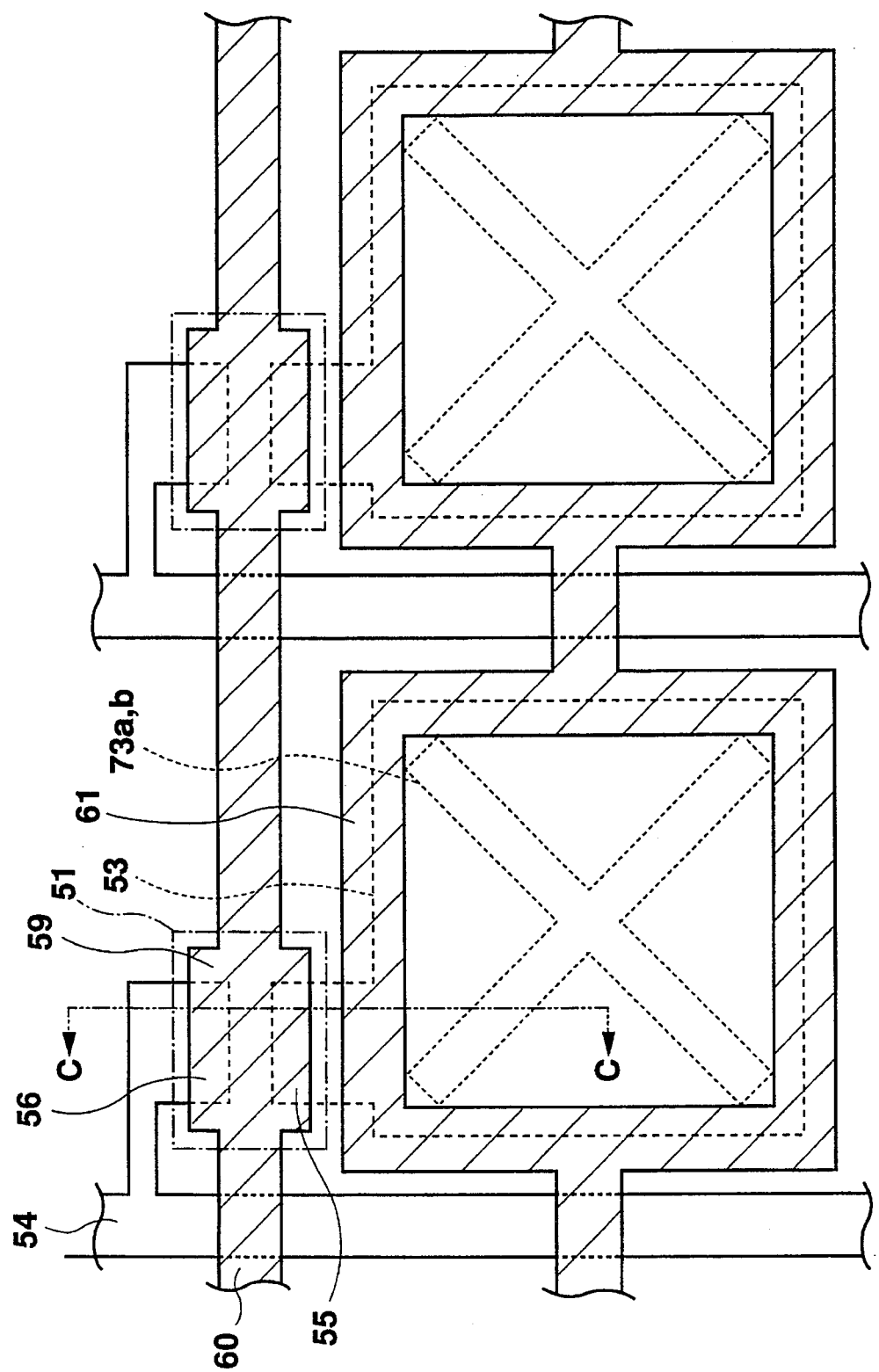
FIG. 14 is a plan view of a liquid crystal display according to a fifth or sixth embodiment of the invention.
Figure 15:
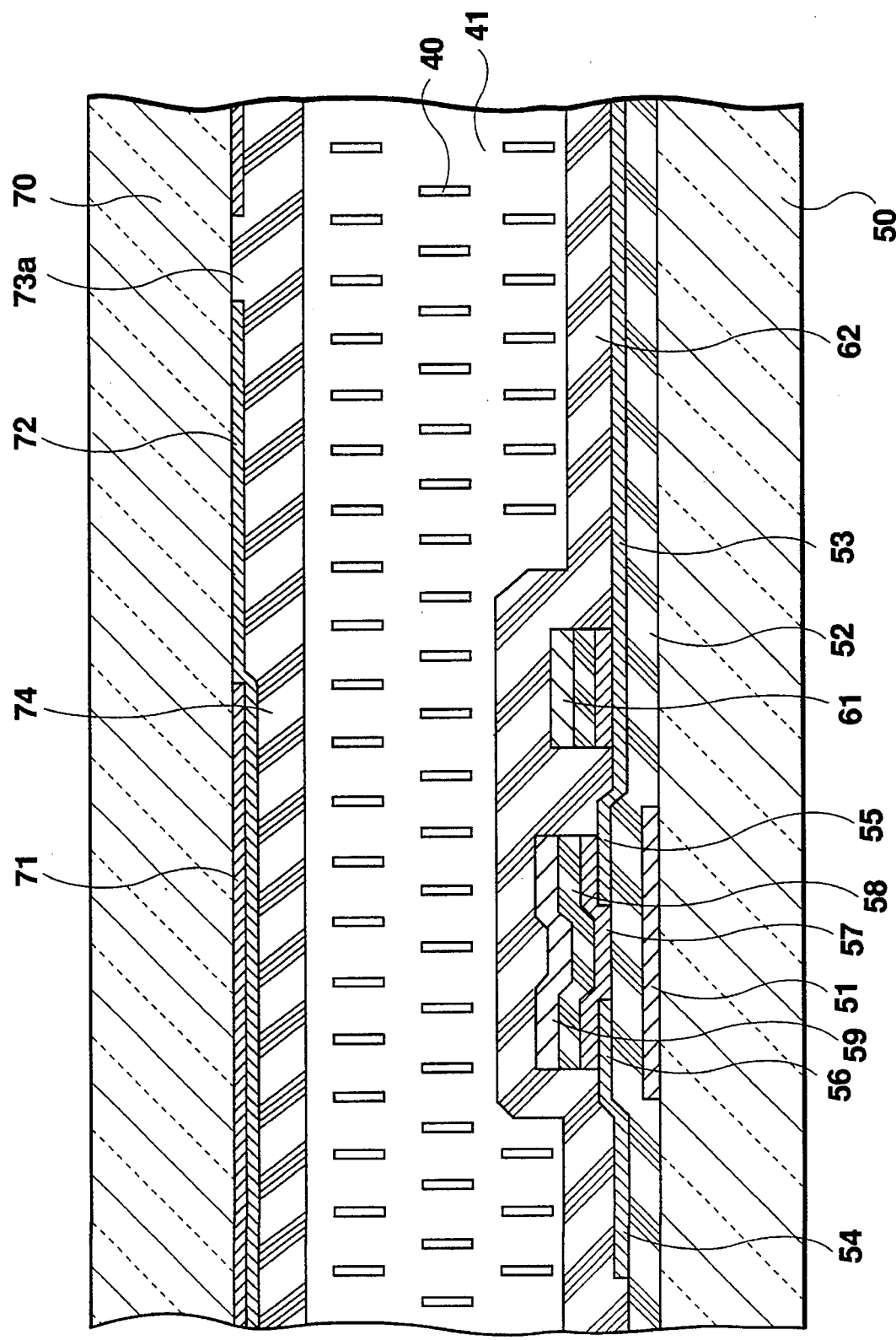
FIG. 15 is a sectional view taken on line C—C in FIG. 14.

FIG. 15 is a sectional view taken on line C—C in FIG. 14. A shielding film 51 is formed by sputtering and then photoetching Cr, for example, on a transparent substrate 50 such as glass. S1Nx or the like is laminated on the full face of the substrate so as to cover the shielding film 51 to form an interlayer insulation film 52. On the interlayer insulation film 52, the display electrode 53, a part of which serves as the source electrode 55, and the drain line 54, a part of which serves as a drain electrode 56, are formed by sputtering and photoetching of ITO.

A channel layer a-Si 57, a gate insulation film 58 SiNx, and a gate metal Al are laminated in order on source and drain lines (53, 54, 55, 56), and the laminate is etched with the same mask to form the gate line 60 and the orientation control electrode 61. In the area on the shielding film 51, a part of the gate line 60 is formed as a gate electrode 59 on the source and drain electrodes 55 and 56 to provide the normal stagger type TFT with the a-Si 57, gate insulation film 58, and gate electrode 59 laminated in order. Like the TFT, the orientation control electrode 22 has a 3-layer structure of a-Si, SiNx, and Al and is located so as to surround the periphery of the display electrode 53.

Further, a vertical orientation film 62 such as polyimide is formed on the full face to form a TFT substrate.

On the other hand, a shielding film 71 made of Cr is formed on a transparent substrate 70 made of glass and a common electrode 72 of ITO is formed on the full face covering the shielding film. The orientation control window 73a is opened by etching in the common electrode 72. Further, a vertical orientation film 74 is formed on the full face. The opposed substrate of such a structure is disposed facing the TFT substrate with a liquid crystal layer 41 therebetween. The common electrode 72 is connected to the TFT substrate side by silver paste, etc., at four corners of the liquid crystal cell.

In the structure in the embodiment, the potential difference between the orientation control electrode 61 and the common electrode 72 is set smaller than that between the display electrode 53 and the common electrode 72, as in the first embodiment, whereby the electric field distribution in the cell becomes as shown in FIG. 5 and the orientation of liquid crystal directors 40 becomes as shown in FIG. 6 as a plane. The function and effect related to the orientation of the liquid crystal directors are the same as those in the first embodiment and therefore will not be discussed again. The structure in the embodiment enables the TFT substrate to be manufactured with three masks, as seen in the description given above, thereby reducing manufacturing costs.

Figure 16:
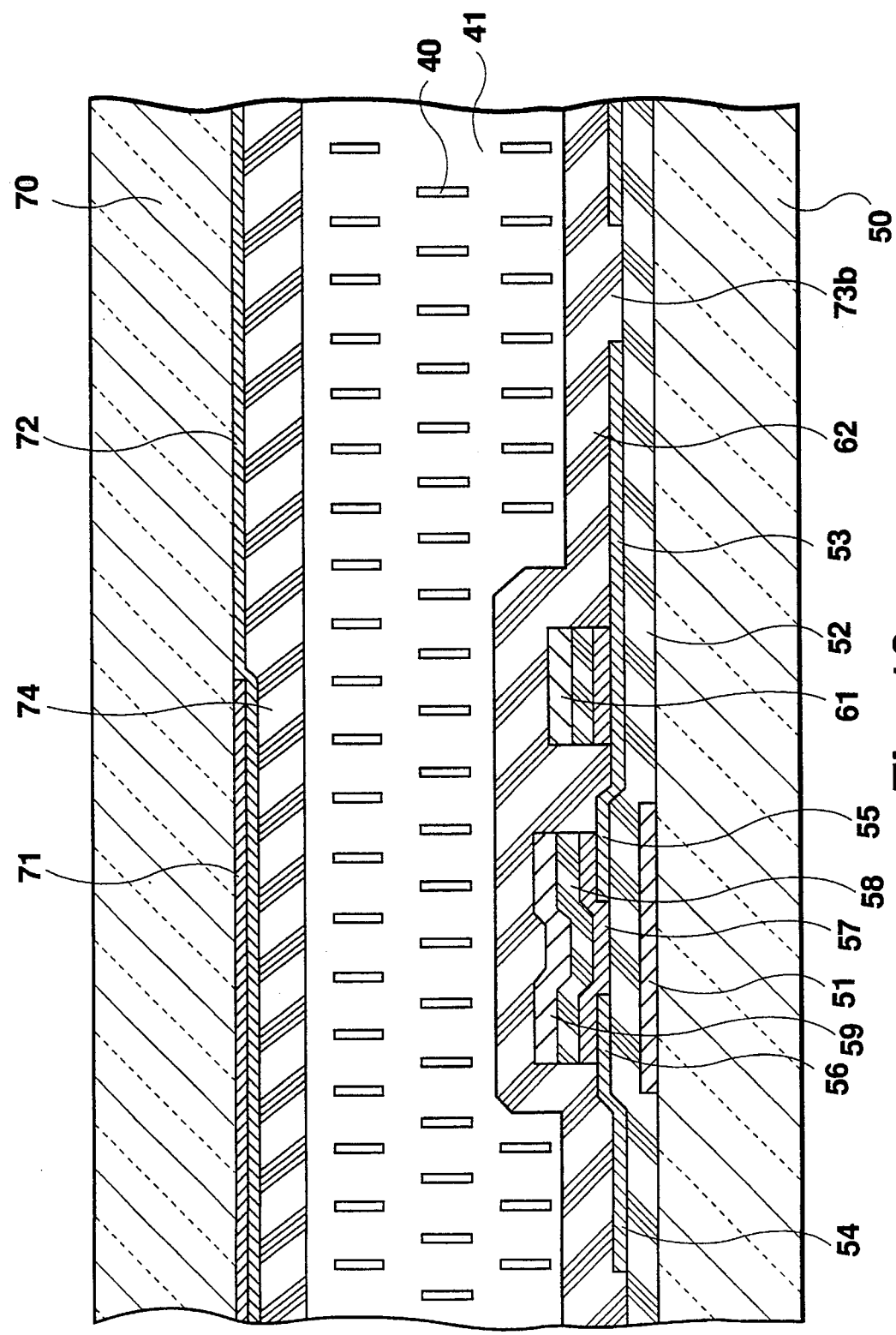
FIG. 16 is a sectional view taken on line C—C in FIG. 14.

In the embodiment, the orientation control window located in the common electrode 72 in the fifth embodiment is located in a display electrode 53 on the corresponding TFT substrate, as indicated by reference numeral 73b in FIG. 16. Further, the potential difference between an orientation control electrode 61 and a common electrode 72 is set larger than that between the display electrode 53 and the common electrode 72. The orientation control window 73b is opened at the same time as formation of source and drain wiring (53, 54, 55, 56) when the ITO is patterned. Then, the electric field distribution in the cell becomes as shown in FIG. 9 and the orientation of liquid crystal directors 40 becomes as shown in FIG. 10 as a plane. The function and effect related to the orientation of the liquid crystal directors are the same as those in the second embodiment.

As seen in the description given above, the orientation vectors of the liquid crystal directors in each display picture element are symmetrically restricted by the orientation control electrode, and the boundaries between areas different in orientation vectors are fixed by the orientation control window. Therefore, viewing angle dependency is reduced and display at wide viewing angles is enabled. Also, occurrence of uniform disclination varying from one picture element to another can be prevented, removing a rough surface of the display screen and thus improving display quality.

Rubbing treatment of the orientation film is not required, reducing the manufacturing costs and eliminating static electricity occurring during rubbing for preventing the TFT from being electrostatically destroyed.

What is claimed is:

1. In a liquid crystal display comprising:

a first substrate;

a second substrate;

said first and second substrates being located facing each other with a liquid crystal layer therebetween;

a plurality of display electrodes disposed in a matrix;

switching elements connected to said display electrodes;

said display electrodes and said switching elements being formed on the liquid crystal layer side of said first substrate; and a common electrode being formed on the liquid crystal layer side of said second substrate, wherein a predetermined voltage is applied to said display electrodes to directly drive said liquid crystal layer for display, the improvement comprising:

orientation control electrodes formed on said first substrate and electrically insulated from said display electrodes, wherein a potential voltage independent from that of a display electrode potential is applied to said orientation control electrodes for controlling orientation of said liquid crystal layer.

2. The liquid crystal display as claimed in claim 1, wherein said switching elements are thin film transistors.

3. The liquid crystal display as claimed in claim 2, wherein each of said thin film transistors is a normal stagger type thin film transistor including a gate electrode formed via a semiconductor film and a gate insulation film above a source electrode and a drain electrode.

4. In a liquid crystal display comprising:

a first substrate;

a second substrate;

said first and second substrates being located facing each other with a liquid crystal layer therebetween;

a plurality of display electrodes disposed in a matrix;

switching elements connected to said display electrodes;

said display electrodes and said switching elements being formed on the liquid crystal layer side of said first substrate; and a common electrode being formed on the liquid crystal layer side of said second substrate, wherein a predetermined voltage is applied to said display electrodes to directly drive said liquid crystal layer for display, the improvement comprising:

orientation control electrodes formed on said first substrate and electrically insulated from said display electrodes, wherein a potential difference between said display electrode and said common electrode is applied to said orientation control electrode for controlling orientation of said liquid crystal layer, and wherein said orientation electrodes are formed in all areas except a formation area of said display electrodes or at least surrounding a periphery of said display electrodes.

5. The liquid crystal display as claimed in claim 4, wherein said orientation control electrodes are formed partially overlapping a peripheral edge of said display electrodes.

6. The liquid crystal display as claimed in claim 5, wherein said orientation control electrodes are electrically connected to said common electrode.

7. The liquid crystal display as claimed in claim 6, wherein said orientation control electrodes corresponding to picture elements on the same gate line are connected to each other.

8. The liquid crystal display as claimed in claim 7, wherein the overlapping portion of said orientation control electrode and said display electrode forms a substorage capacitance of each picture element, said substorage capacitance being electrically connected in parallel with a display capacitance of each picture element formed by said common electrode and said display electrode.

9. The liquid crystal display as claimed in claim 5, wherein the overlapping portion of said orientation control electrode and said display electrode forms a substorage capacitance for a picture element, said substorage capacitance being electrically connected in parallel with a display capacitance of each picture element formed by said common electrode and said display electrode.

10. The liquid crystal display as claimed in claim 4, wherein an orientation control window containing no electrode is formed in a picture element area of said common electrode.

11. The liquid crystal display as claimed in claim 10, wherein an effective potential difference between said orientation control electrode and said common electrode is smaller than that between said display electrode and said common electrode.

12. The liquid crystal display as claimed in claim 11, wherein said orientation control electrodes are electrically connected to said common electrode.

13. The liquid crystal display as claimed in claim 10, wherein said orientation control window is formed like an X character.

14. The liquid crystal display as claimed in claim 4, wherein an orientation control window containing no electrode is formed in a picture element area of each of said display electrodes.

15. The liquid crystal display as claimed in claim 14, wherein an effective potential difference between said orientation control electrode and said common electrode is larger than that between said display electrode and said common electrode.

16. The liquid crystal display as claimed in claim 14, wherein said orientation control window is formed like an X character.

17. In a liquid crystal display comprising:

a first substrate;

a second substrate;

said first and second substrates being located facing each other with a liquid crystal layer therebetween;

a plurality of display electrodes disposed in a matrix:

switching elements connected to said display electrodes;

said display electrodes and said switching elements being formed on the liquid crystal layer side of said first substrate; and a common electrode being formed on the liquid crystal layer side of said second substrate, wherein a predetermined voltage is applied to said display electrodes to directly drive said liquid crystal layer for display, the improvement comprising:

orientation control electrodes formed on said first substrate and electrically insulated from said display electrodes, wherein a potential difference between said display electrode and said common electrode is applied to said orientation control electrode for controlling orientation of said liquid crystal layer, wherein said switching elements are thin film transistors, wherein each of said thin film transistors is a normal stagger type thin film transistor including a gate electrode formed via a semiconductor film and a gate insulation film above a source electrode and a drain electrode and wherein an orientation control window containing no electrode is formed in a picture element area of said common electrode, and each of said orientation control electrodes is formed via the semiconductor film and the gate insulation film on said display electrode.

18. In a liquid crystal display comprising:

a first substrate:

a second substrate;

said first and second substrates being located facing each other with a liquid crystal layer therebetween;

a plurality of display electrodes disposed in a matrix;

switching elements connected to said display electrodes:

said display electrodes and said switching elements being formed on the liquid crystal layer side of said first substrate; and a common electrode being formed on the liquid crystal layer side of said second substrate, wherein a predetermined voltage is applied to said display electrodes to directly drive said liquid crystal layer for display, the improvement comprising:

orientation control electrodes formed on said first substrate and electrically insulated from said display electrodes, wherein a potential difference between said display electrode and said common electrode is applied to said orientation control electrode for controlling orientation of said liquid crystal layer, wherein said switching elements are thin film transistors, wherein each of said thin film transistors is a normal stagger type thin film transistor including a gate electrode formed via a semiconductor film and a gate insulation film above a source electrode and a drain electrode, and wherein an orientation control window containing no electrode is formed in a picture element area of each of said display electrodes, and each of said orientation control electrodes is formed via the semiconductor film and the gate insulation film on said display electrode.

19. A liquid crystal display comprising:

a first substrate;

a second substrate, said first and second substrates being located facing each other with a liquid crystal layer therebetween;

a plurality of display electrodes disposed in a matrix;

switching elements connected to said display electrodes, said display electrodes and said switching elements being formed on the liquid crystal layer side of said first substrate;

a common electrode formed on the liquid crystal layer side of said second substrate, wherein a predetermined voltage is applied to said liquid crystal layer for display; and orientation control electrodes formed on said first substrate and electrically insulated from said display electrodes, the orientation control electrodes surrounding an entire periphery of the display electrodes to maximize a display area of the liquid crystal layer, wherein a potential independent from that of a display electrode potential is applied to said orientation control electrode for controlling orientation of the liquid crystal layer, and wherein the orientation of the crystal layer is controlled independently of a layer that has a rubbing direction for orientating the liquid crystal layer.

20. A liquid crystal display element comprising:

a first substrate;

a second substrate, the first and second substrates being located facing each other with a liquid crystal layer therebetween;

a display electrode;

a switching element connected to the display electrode, the display electrode and the switching elements being formed on the liquid crystal layer;

a common electrode also formed on the liquid crystal layer; and an orientation control electrode formed on the first substrate and electrically insulated from the display electrode, the orientation control electrode surrounding an entire periphery of the display electrode to maximize a display area of the liquid crystal layer, wherein a potential independent from a display electrode potential is applied to the orientation control electrode for controlling orientation of the liquid crystal layer, and wherein the orientation of the crystal layer is controlled independent of a layer that has a rubbing direction for orientating the liquid crystal layer.

21. A liquid crystal display element comprising:

a first substrate;

a second substrate, the first and second substrates being located facing each other with a liquid crystal layer therebetween;

a display electrode;

a switching element connected to the display electrode, the display electrode and the switching elements being formed on the liquid crystal layer;

a common electrode also formed on the liquid crystal layer; and an orientation control electrode formed on the first substrate and electrically insulated from the display electrode, the orientation control electrode surrounding an entire periphery of the display electrode to maximize a display area of the liquid crystal layer, wherein a potential different from a display electrode potential is applied to the orientation control electrode for controlling orientation of the liquid crystal layer, and wherein the orientation of the crystal layer is controlled independent of a layer that has a rubbing direction for orientating the liquid crystal layer, and wherein the orientation control electrode overlaps a portion of a peripheral edge of the display electrode.

22. A liquid crystal display element comprising:

a first substrate;

a second substrate, the first and second substrates being located facing each other with a liquid crystal layer therebetween;

a display electrode;

a switching element connected to the display electrode, the display electrode and the switching elements being formed on the liquid crystal layer;

a common electrode also formed on the liquid crystal layer; and an orientation control electrode formed on the first substrate and electrically insulated from the display electrode, the orientation control electrode surrounding an entire periphery of the display electrode free of any overlap with the display electrode to maximize a display area of the liquid crystal layer, wherein a potential different from a display electrode potential is applied to the orientation control electrode for controlling orientation of the liquid crystal layer.

* * * * *